July 11, 1961 K. N. FROMM ET AL 2,992,396
MULTIPLE FREQUENCY GENERATOR
Filed Nov. 14, 1957

Inventors:
Kenneth N. Fromm,
Gene A. Richards,
by Their Attorneys.

United States Patent Office 2,992,396
Patented July 11, 1961

2,992,396
MULTIPLE FREQUENCY GENERATOR
Kenneth N. Fromm, Cincinnati, Ohio, and Gene A. Richards, Fort Wayne, Ind., assignors to International Telephone and Telegraph Corporation
Filed Nov. 14, 1957, Ser. No. 696,531
8 Claims. (Cl. 331—39)

The present invention relates to a multiple frequency generator and more particularly to a system for generating a plurality of frequencies having equal spacing.

A common method of generating a plurality of frequencies having equal spacing is to generate harmonics of the spacing frequency. In the microwave frequency spectrum, however, this harmonic generation becomes tremendously involved because of the large number of multiplications required. For example, if 10 megacycle spacing at 10,000 megacycles is required, a multiplication factor of 1,000 would be necessary. The present invention provides a means for obtaining a plurality of frequencies having equal spacing according to a much simpler method.

It is therefore an object of this invention to provide a multiple frequency generator which is the ultimate in simplicity and ease of operation.

It is another object of this invention to provide a multiple frequency generator whereby multiple frequencies of equal spacing are obtained by generating first, second and higher order carriers which are repeatedly circulated to an amplifier in a closed loop circuit for producing side bands constituting the aforementioned multiple frequencies.

In accordance with this invention, there is provided, in combination, amplifying means having input and output circuits, modulating means operatively coupled between said input and output circuits, and signal-generating means operatively coupled to the modulating means and supplying a signal of given frequency thereto. In one preferred embodiment of this invention, the modulating means is a balanced modulator designed to suppress the carrier signal fed thereto.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
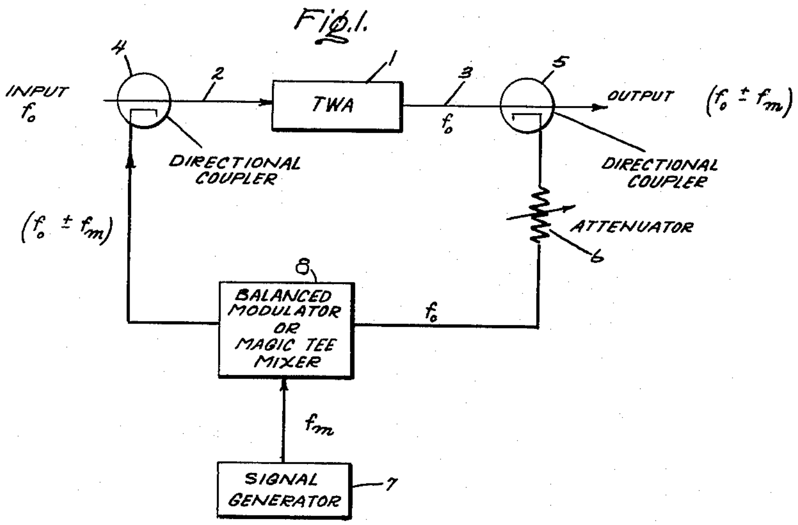
FIG. 1 is a block diagram of one embodiment of this invention.

Referring to the drawings, and more particularly to FIG. 1, the illustrated embodiment of this invention is intended to be used in the microwave frequency spectrum, for example between the frequencies of 7,000 and 11,000 megacycles. A traveling wave amplifier 1 of conventional type, for example, a type HA–4 Huggins Laboratories, Inc., is provided with input and output circuits 2 and 3 respectively. A balanced modulator or magic T mixer 8 is coupled between these input and output circuits 2 and 3 by means of directional couplers 4 and 5 respectively. A suitable attenuator 6 is serially connected between the coupler 5 and the modulator 8 for a purpose which will be later explained. A signal generator 7 designed to generate a signal of fixed, given frequency is also coupled to the modulator 8, as shown.

The directional couplers 4 and 5 are of conventional design and are described in chapter 14 of the Radiation Laboratory Series, "Techniques of Microwave Measurements." The balanced modulators or magic T mixer 8 is also of conventional design and is disclosed in the same Radiation Laboratory Series in vol. 11, p. 525. Desirably, the modulator 8 is preferably balanced for suppressing the carrier which may be coupled thereto, the signal from the generator 7 serving to modulate the carrier, thereby resulting in the production of side bands by the modulator 8 which are coupled to the directional coupler 4.

In operation, a signal of center frequency $f_0$ is coupled to the input circuit 2 of the amplifier 1. This same signal $f_0$ appears in the output circuit 3, a portion thereof being coupled therefrom by means of the directional coupler 5 to the balanced modulator 8. The attenuator 6 is adjusted so as to prevent too much signal from being coupled to the modulator 8, in other words to prevent the modulator or mixer 8 from being damaged.

The signal indicated by the symbol $f_m$ from the generator 7 is also coupled to the modulator 8 which thereupon produces two side bands or difference frequencies of $(f_0 \pm f_m)$. The modulator 8 suppresses the carrier $f_0$ so that the only signals appearing in the output circuit of the modulator 8 will be the two signals at frequencies $(f_0 \pm f_m)$. These two signals or side bands are coupled into the input circuit 2 by means of the directional coupler 4 and are amplified by the amplifier 1 and fed to the output circuit 3. A portion of these side bands is picked off and coupled to the modulator 8 and are modulated or heterodyned with the signal $f_m$ from the generator 7 to produce second order side bands in the output circuit of the modulator. Again, the modulator 8 suppresses the side bands (carriers) which are fed thereto. This cyclical action continues, producing higher order side bands all being spaced apart by the amount $f_m$. The signals ultimately appearing in the output circuit 3 will correspond to a broadband spectrum of equally spaced frequencies.

Figure 2:
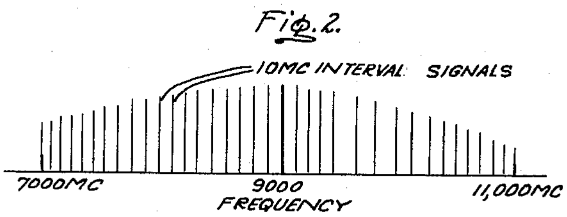
FIG. 2 is a graph showing multiple frequency signals and is used in explaining the operation of the invention.

In further explanation of the operation of this invention, practical examples may be selected and a graph plotted something along the order of FIG. 2. Assuming that $f_0$ is equal to 9,000 megacycles, and $f_m$ of generator 7 is ten (10) megacycles, the first two signals or side bands appearing in the output circuit of the modulator 8 will have frequencies of 9010 megacycles and 8990 megacycles. The center frequency of 9,000 megacycles is suppressed by the modulator. These two signals are coupled back into the amplifier 1 and a portion thereof is coupled back into the modulator 8. These two signals are mixed with or modulated by the ten (10) megacycle signal from generator 7, thereby producing in the output circuit of the modulator 8 four additional signals having frequencies of 9,000 megacycles, 8,980 megacycles, 9,000 megacycles, and 9,020 megacycles. These four frequencies are achieved by reason of the mixing of the ten (10) megacycle signal from generator 7 with the two signals of frequencies 8,990 megacycles and 9,010 megacycles. As in the first instance, the signals fed to the input circuit of the modulator 8 are suppressed. By always suppressing the carriers fed to the modulator, the loop is prevented from regenerating. By reason of the fact that the center frequency of 9,000 megacycles will be repeated more often than any of the other signal frequencies, the amplitude of this center frequency will always be the greatest. The resultant signal in the output circuit 3 will correspond to that represented by FIG. 2, and will be composed of a plurality of signals all spaced ten (10) megacycles apart.

While the invention has been illustrated and described in relation to the production of multiple frequencies in the microwave spectrum, it will of course appear obvious to those skilled in the art that the principles of this invention may be used for producing equally spaced, multiple frequencies in any desired frequency spectrum. Considering a low frequency spectrum, instead of using a traveling wave amplifier 1, an ordinary radio frequency amplifier might be used. Also, the couplers 4 and 5 for this lower frequency case may consist of simple coupling condensers or networks.

While we have described above the principles of our invention in connection with specific apparatus, it is to be clearly understood that this description is made only by way of example and not as a limitation to the scope of our invention.

What is claimed is:

1. In combination, amplifying means having input and output circuits, balanced-modulating means, means for coupling directly a portion of the signal energy appearing in said output circuit to said modulating means, means for coupling directly the signal of said modulating means to said input circuit, means for applying a signal of predetermined frequency to said input circuit, and means for supplying a modulating signal of predetermined frequency to said modulating means whereby side-band signals only are applied to said input circuit.

2. In combination, amplifying means having input and output circuits, balanced-modulating means operatively coupled between said input and output circuits, said modulating means including means suppressing a carrier signal fed thereto from said output circuit, and a modulating-signal generator operatively coupled to said modulating means and supplying a signal of given frequency thereto whereby side-band signals only are applied to said input circuit.

3. In combination, a traveling wave amplifier having input and output circuits, a balanced modulator, a first directional coupler directly coupling said output circuit to said modulator, a second directional coupler directly coupling said modulator to said input circuit, and a signal generator operatively coupled to said modulator and supplying a signal of given frequency thereto whereby side-band signals only are applied to said input circuit.

4. In combination, an amplifier having input and output circuits, means for applying a signal of predetermined frequency to said input circuit, a feedback circuit directly coupled between said input and output circuits, said feedback circuit including a balanced modulator and means for applying a modulating signal of predetermined fixed frequency to said balanced modulator whereby the signals appearing in said output circuit are mixed with said modulating signal, said balanced modulator including means for suppressing the signals fed thereto from said output circuit whereby the signals coupled to said input circuit are composed of only the side-bands of the aforementioned mixing action, whereby a multiplicity of signals spaced apart by equal frequency intervals appear in said output circuit.

5. In combination, an amplifier having input and output circuits, means for applying a signal of predetermined frequency to said input circuit, a feedback circuit directly coupled between said input and output circuits, said feedback circuit including means for mixing the signal appearing in said output circuit with a modulating signal of predetermined fixed lesser frequency to produce the side-bands of the mixing action and for suppressing the signal from said output circuit, whereby a multiplicity of signals spaced apart by equal frequency intervals appear in said output circuit.

6. In combination, amplifying means having input and output circuits, balanced-modulating means, means directly coupling said balanced-modulating means between said input and output circuits, means applying a signal of predetermined frequency to said input circuit, and means applying a signal of second predetermined frequency to said balanced-modulating means for generating side band signals which are applied to said input circuit, whereby a multiplicity of signals spaced apart by equal frequency intervals appear in said output circuit.

7. In combination, an amplifier having input and output circuits, means for applying a signal of predetermined frequency to said input circuit, said amplifier supplying said signal to said output circuit in amplified form, a feedback circuit directly coupled between said input and output circuits, said feedback circuit including means for mixing all signals appearing in said output circuit with a modulating signal of predetermined fixed lesser frequency to produce side-bands of the mixing action and for applying these side-bands to said amplifier input circuit, means supplying said modulating signal to said mixing means, said feedback circuit further including means for suppressing the signals from said output circuit thereby preventing these signals from being applied to said input circuit, whereby a multiplicity of signals spaced apart by equal frequency intervals appear in said output circuit.

8. In combination, an amplifier having input and output circuits, first means for applying a first signal of predetermined frequency to said input circuit, second means for supplying a second signal of predetermined lesser frequency, modulating means coupled between said input and output circuits and to said second means for mixing signals appearing in said output circuit with said second signal and for applying the side-bands of such mixing to said input circuit, said modulating means including means for suppressing and thereby preventing the signals in said output circuit from being coupled to said input circuit, said amplifier passing said first signal and said side-bands to said output circuit for providing a multiplicity of signals spaced apart by equal frequency intervals in said output circuit.

References Cited in the file of this patent

UNITED STATES PATENTS

| | | |
|---|---|---|
| 1,604,140 | Affel | Oct. 26, 1926 |
| 1,799,159 | Espenschied | Apr. 7, 1931 |
| 2,159,595 | Miller | May 23, 1939 |
| 2,267,703 | Henkler | Dec. 23, 1941 |
| 2,379,042 | Shaw | June 26, 1945 |
| 2,620,468 | Chireix | Dec. 2, 1952 |
| 2,724,775 | Field | Nov. 22, 1955 |
| 2,773,179 | Makow | Dec. 4, 1956 |

FOREIGN PATENTS

| | | |
|---|---|---|
| 676,714 | Great Britain | July 30, 1952 |